United States Patent
Tangonan

(10) Patent No.: US 6,618,189 B2
(45) Date of Patent: Sep. 9, 2003

(54) RADIO FREQUENCY WAVE AND OPTICAL BEAM STEERER COMBINATION

(75) Inventor: Gregory L. Tangonan, Oxnard, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 09/829,780

(22) Filed: Apr. 10, 2001

(65) Prior Publication Data

US 2002/0146192 A1 Oct. 10, 2002

(51) Int. Cl.[7] .................................................. G02F 1/29
(52) U.S. Cl. ........................ 359/298; 359/245; 359/254
(58) Field of Search ................................. 359/278, 279, 359/298, 240, 245, 254, 315, 319, 316, 288

(56) References Cited

U.S. PATENT DOCUMENTS

| | | | | |
|---|---|---|---|---|
| 4,323,901 A | * | 4/1982 | De Wames et al. | 343/754 |
| 5,093,740 A | | 3/1992 | Dorschner et al. | 359/88 |
| 5,943,159 A | | 8/1999 | Zhu | 359/316 |
| 5,963,682 A | | 10/1999 | Dorschner et al. | 385/16 |

OTHER PUBLICATIONS

Chiao, J.C., "MEMS for High–Frequency Applications", *Smart Structure and Materials 2001 : Smart Electronics and MEMS, Proceedings of SPIE*, vol. 4334, pp. 13–22 (2001).

Ruffin, P.B., et al., "Recent Progress in MEMS Technology Development for Military Applications", *Smart Structure and Materials 2001 : Smart Electronics and MEMS, Proceedings of SPIE*, vol. 4334, pp. 1–12 (2001).

Brown, E.R., "RF–MEMS Switches for Reconfigurable Integrated Circuits", *IEEE Transactions on Microwave Theory and Techniques*, vol. 46, No. 11, pp. 1868–1880 (Nov. 1998).

Schaffner, J.H., et al., "Reconfigurable Aperture Antennas Using RF MEMS Switches for Mulit–Octave Tunability and Beam Steering", *XP–002208299 IEEE*, pp. 321–324 (2000).

* cited by examiner

*Primary Examiner*—Hung Xuan Dang
*Assistant Examiner*—Joseph Martinez
(74) *Attorney, Agent, or Firm*—Ladas & Parry

(57) ABSTRACT

A combination RF and optical beam steerer comprising an optically transparent substrate having first and second major surfaces, the first surface having disposed thereon an array of conductive elements associated with a radio frequency beam steerer and the second surface thereof having an array of elements disposed thereon associated with an optical beam steerer. The spacing of the elements in the RF beam steerer are at least ten times the wavelength of the optical energy to be steered by the device so that the RF beam steerer appears to be essentially optically transparent to the optical energy whereas as the array associated with the optical beam steerer is sufficiently closely spaced so as to function as a ground plane for the RF beam steerer.

47 Claims, 2 Drawing Sheets

RADIO FREQUENCY WAVE AND OPTICAL BEAM STEERER COMBINATION

The present invention relates to a device which can steer at the same time RF waves and optical beams with different amounts of steerage being applied to the RF waves verses the optical beams.

BACKGROUND

This invention combines two technological thrusts, namely, optical beam steering and RF wave beam steering using a common reflective surface. The combination provides a single aperture that steers both types of beams simultaneously, yet differently.

In the prior art, both RF beam steerers and optical beam steerers are known. In terms of optical beams steerers, exemplary prior art designs include those disclosed by U.S. Pat. Nos. 5,093,740; 5,943,159 and 5,963,682.

SUMMARY

A combination RF and optical beam steerer include an optically transparent substrate having first and second major surfaces, the first surface having disposed thereon an array of conductive elements associated with a radio frequency beam steerer and the second surface thereof having an array of elements disposed thereon associated with an optical beam steerer. The spacing of the elements in the RF beam steerer is at least 10 times the wavelength of the optical energy to be steered by the device so that the RF beam steerer appears to be essentially optically transparent to the optical energy. Further, in order for the optical beam steerer to function as a ground plane for the RF beam steerer, the array associated with the optical beam steerer preferably has a spacing 1000 times less than the wavelength of the RF energy to be steered.

DETAILED DESCRIPTION

Figure 1:
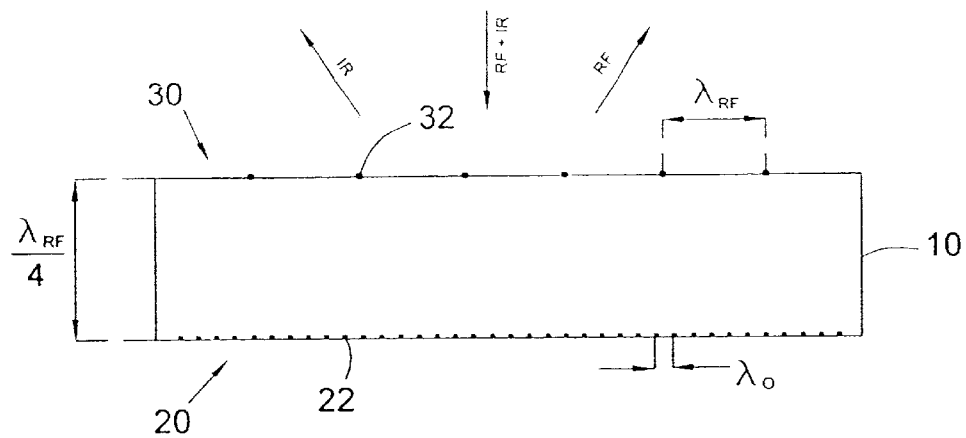
FIG. 1 is a side elevational view of a substrate carrying both an RF beam steerer and a optical beam steerer.

FIG. 1 is a side elevational view of a substrate 10 having a first major surface 30 upon which is disposed or arranged a RF beam steerer and a second major surface 20 upon which is disposed or arranged an optical beam steerer. RF beam steerers and optical beam steerers tend to comprise arrays of elements and single elements of those arrays are shown at numerals 32 and 22, respectively. The spacings between adjacent conductive elements 22 for the optical beam steerer are typically on the order of 0.5 to 1.0 times the wavelength of the optical energy to be steered (which can be visible light or Infrared, IR, energy) which generally falls in the range of a few tenths of a micrometer to a few tenths of a millimeter. The spacings between adjacent elements 32 for the RF beam steerer would typically be 0.5 to 1.0 times the wavelength of the radio frequencies of interest and hence a distance usually measured in terms of a few millimeters or perhaps a few centimeters.

Two different modes of operation are possible depending on the order in which the steering surfaces (RF or optical) are impinged. Although neither mode is preferred over the other, the following description covers the case where the RF steerer (10, 20, 22, 30, 32) is impinged before the optical steerer (20, 22). With reference to FIG. 1, the incoming RF and optical energy to be steered impinges the RF beam steerer surface 30 first. At radio frequencies, the rear surface 20 of substrate 10, having a relatively fine array of conductors 22 disposed thereon, will appear as a solid ground plane given its relatively fine structure compared to the wavelength of the incoming radio frequency signals. The distance of the ground plane 20 from the surface 30 having the elements 32 disposed thereon would typically be on the order of $\lambda_{RF}/4$, where $\lambda_{RF}$ is the wavelength of the incoming RF signal. Since the spacings of elements 32 are significantly wider than the spacings of elements 22, in the optical range, the grading formed by elements 32 is essentially transparent and has no effect (except for some losses) on the incoming optical energy. Indeed, the conductors 32 on the surface 30 of the substrate 10 can be formed by transparent conductors if desired although typical metal conductors would be satisfactory.

Thus, the optical energy is steered by using optical beam steering techniques only on the rear surface 20. On the other hand, with respect to the RF energy impinging substrate 10, it is steered by elements 32 using well known RF beam steering techniques in combination with a ground plane (20, 22) spaced in an appropriate distance from elements 32. As indicated above, elements 22 are finely spaced compared to the spacings of the elements 32, and thus elements 22, in combination, will behave like a ground plane when used in conjunction with elements 32 in terms of a RF beam steerer. The spacing between adjacent elements 22 is preferably at least 1000 times less than the wavelength of the radio frequencies of interest $\lambda_{RF}$, so that elements 22, in combination, behave like a ground plane when interacting with these radio frequencies (spacing $\leq 1000 \times \lambda_{RF}$).

The optical beam associated with the optical energy and the RF beam associated with the RF energy may impinge the combination RF and optical beam steerer simultaneously or at different times. Further, the optical beam and the RF beam may or may not have the same incidence angle on the combination beam steerer of the present invention.

Figure 2:
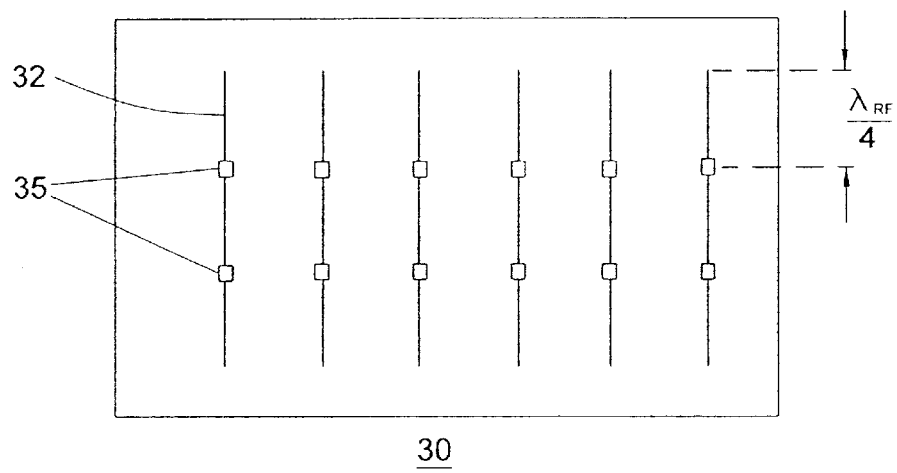
FIG. 2 is a plan view of the device of FIG. 1, showing an embodiment of a RF beam steerer arranged thereon.
Figure 3:
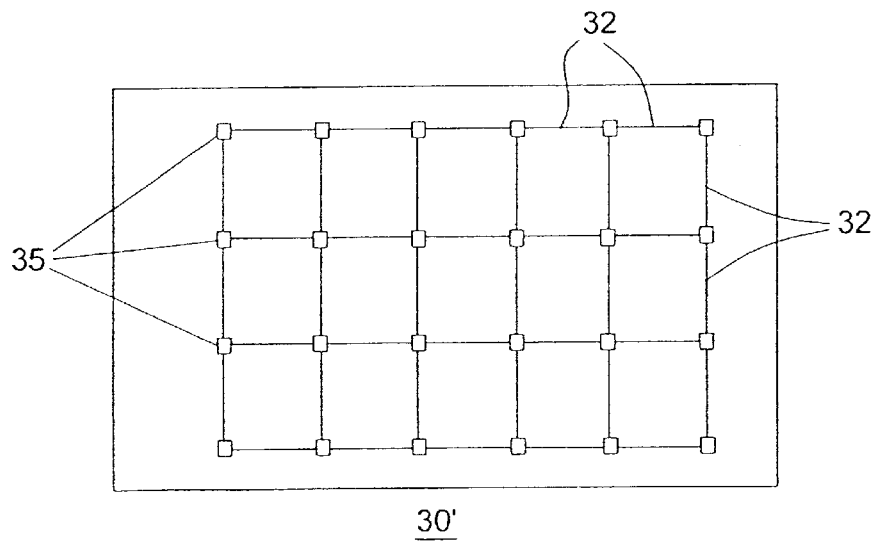
FIG. 3 is a plan view of the device of FIG. 1, showing another embodiment of a RF beam steerer arranged thereon.

FIG. 2 shows a plan top view of substrate 10 showing surface 30 with elements 32 formed thereon in longitudinal patterns with RF MEM switches 35 connecting elements 32 so as to change their electrical length by controlling which RF MEM switches 35 are ON and which ones are OFF. Alternatively, instead of arranging elements 32 in a linear array, they may be arranged in a grid pattern on a surface 30' as shown in FIG. 3 with RF MEM switches at their junctions.

Figure 4:
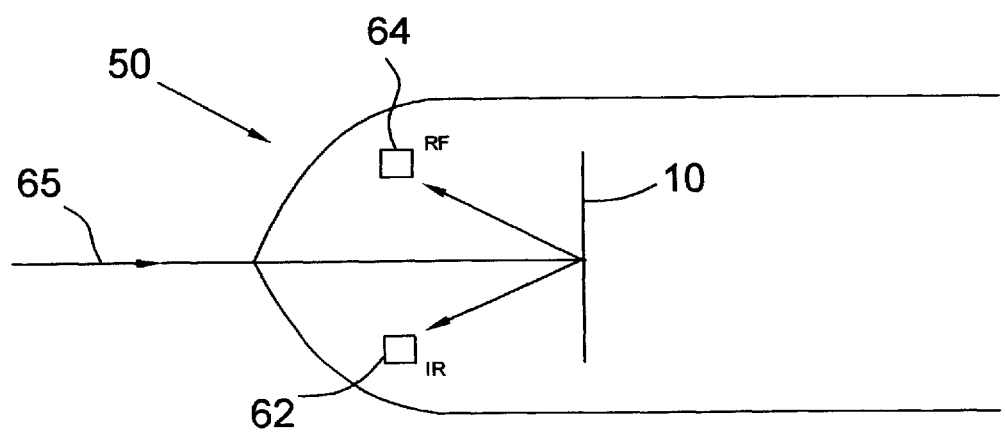
FIG. 4 shows an application of the device in the nose cone of a missile.

A practical application of the device shown in FIG. 1 is shown in FIG. 4. FIG. 4 shows the nose cone 50 of a missile which might be used against enemy aircraft, for example. The incoming RF and optical energy from the enemy aircraft might well comprise radio frequency radar returns in combination with an infrared optical signature from the aircraft. That combined signal 60 impinges the device shown in FIG. 1 separating the optical infrared energy from the millimeter RF energy to direct those energies to separate detectors.

Thus, a detector 62 would be sensitive to infrared energy while detector 64 would be sensitive to radio frequency energy perhaps in the millimeter wavelength region.

As is well known, for RF beam steering, several RF beam reflectors or RF beam lens architectures are known using PIN diode arrays or RF MEM switch arrays for re-configuring the array of conductors 32. The RF MEM switch devices 35 activate a small patch antenna or dipole elements that make up an antenna array. Steering is done by changing the reflector strength by generating a wavelength off a small patch antenna or dipole antenna. This wavelength combines with the stronger reflected signal from the ground plane (comprised of elements 22), the resulting reflected wave being phase steered. Thus, the RF beam steerer 30 can impose a tilting of the phase front of the reflected RF beam without the need of a gimbal.

Figure 5:
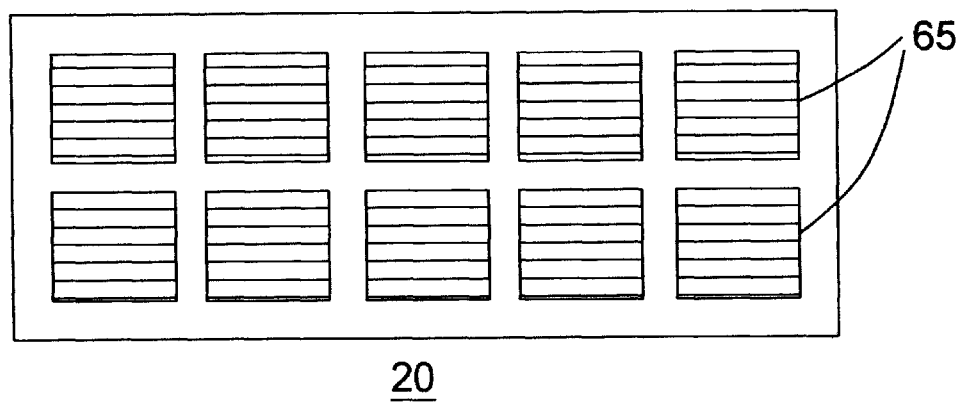
FIG. 5 is a plan view of FIG. 1 showing an embodiment of an optical beam steerer arranged thereon.
Figure 6:
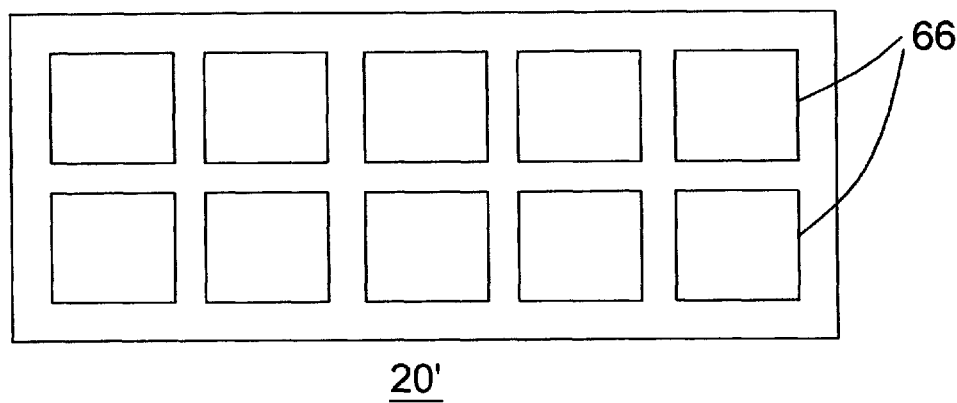
FIG. 6 is a plan view of FIG. 1 showing another embodiment of an optical beam steerer arranged thereon.

For optical beam steering (i.e. the visible range to and including the infrared range), the array 22 that provides the ground plane for the RF beam steerer serves as the optical beam steerer. This can take on several forms, two of which are shown in FIGS. 5 and 6. The ground plane can be segmented into individual phase steering elements (optical punches) that are controlled to a fraction of optical wave lengths. These approaches for optical beam steering are well known in the art.

One of the possible approaches for the optical steering is illustrated in FIG. 5, which shows a MEMS-based scheme in which MEM steerable grating elements 65 are disposed on the rear surface 20 of the substrate 10. Each of these elements 65 has a fine grating for wavelength steering. The elements can be rotated so that different colors from the input image can be diffracted into a detector array. These MEMS devices are becoming standard components in the Optical Designer tool kit. In FIG. 6, a second implementation is shown that uses optical phase array steering. Individual phase shifting elements 66 disposed on a surface 20' can be adjusted in height above the ground plane, allowing different sections of the beam cross-section to be phase modulated. This phase steering will cause the beam to diffract into a detector array. Both of these schemes can be implemented on the opposite side of the substrate from where the RF beam steering is done.

Having described the invention in connection with the preferred embodiment thereof, modification will now suggest itself to those skilled in the art. The invention is therefore not to be limited to the disclosed embodiments, except as required by the appended claims.

What is claimed is:

1. A beam steerer for steering electromagnetic energy received by the beam steerer, the beam steerer comprising a plurality of secondary beam steerers, each secondary beam steerer being associated with a different region of the electromagnetic spectrum from the other secondary beam steerers, the electromagnetic energy comprising a plurality of components, each component being associated with a different region of the electromagnetic spectrum, wherein each component is directed by the beam steerer into a different direction from the direction into which the other components are directed.

2. The beam steerer of claim 1 wherein the plurality of secondary beam steerers comprises a RF beam steerer and an optical beam steerer, the plurality of components comprises a RF energy component and an optical energy component, the RF energy component being steered into a first direction by the RF beam steerer and the optical energy component being steered into a second direction by the optical beam steerer.

3. The beam steerer of claim 2 wherein the RF energy and the optical energy components are simultaneously received by the beam steerer.

4. The beam steerer of claim 3 comprising a substrate having a first surface thereof and a second surface thereof, wherein the first surface includes at least part of the RF beam steerer disposed thereon, and the second surface includes the optical beam steerer disposed thereon.

5. The beam steerer of claim 4, wherein the optical beam steerer comprises a plurality of optical phase steering elements disposed on the second surface, the optical phase steering elements having a spacing between them.

6. The beam steerer of claim 5, wherein the RF beam steerer comprises:

the first surface having a plurality of RF beam steering elements disposed thereon, the RF beam steering elements having a spacing between them; and the second surface;

wherein:

the first surface and the plurality of RF beam steering elements are substantially transparent to optical energy;

the substrate does not substantially affect optical energy traveling through it; and the spacing between the optical phase steering elements disposed on the second surface is at least 1000 times less than a wavelength associated with the RF energy, the second surface thereby being seen as a ground plane by the RF energy.

7. The beam steerer of claim 6, wherein the distance between the first and second surfaces is about one fourth of the wavelength associated with the RF energy.

8. The beam steerer of claim 7, wherein the optical phase steering elements comprise MEM steerable grating elements.

9. The beam steerer of claim 7, wherein the optical phase steering elements comprise phase shifting elements.

10. The beam steerer of claim 9, wherein the phase shifting elements are adjustable in height relatively to the second surface.

11. The beam steerer of claim 7, wherein the RF beam steering elements comprise a linear array of conductors, the conductors being electrically connected or disconnected by respectively closing or opening RF MEM switches disposed therebetween.

12. The beam steerer of claim 7, wherein the RF beam steering elements comprise an array of conductors arranged in a grid, the grid having grid points formed at junctions of the conductors, and wherein RF MEM switches are disposed at the grid points, the RF MEM switches electrically connecting or disconnecting portions of the array of conductors.

13. The beam steerer of claim 7, wherein the RF beam steering elements comprise an array of conductors, and wherein the array of conductors is reconfigured by using RF MEM switch arrays.

14. The beam steerer of claim 7, wherein the RF beam steering elements comprise an array of conductors, and wherein the array of conductors is reconfigured by using PIN diode arrays.

15. The beam steerer of claim 7 further comprising an RF detector for detecting the RF energy directed to the RF detector by the beam steerer, and an optical detector for detecting the optical energy directed to the optical detector by the beam steerer.

16. The beam steerer of claim 7, wherein the spacing between the optical phase steering elements is within a range of about 0.5 to about 1.0 times a wavelength associated with the optical energy, and the spacing between the RF beam steering elements is within a range of about 0.5 to about 1.0 times the wavelength associated with the RF energy.

17. A beam steerer for separating a first electromagnetic beam and a second electromagnetic beam simultaneously impinging the beam steerer, the first electromagnetic beam having a first frequency band associated therewith, the second electromagnetic beam having a second frequency band associated therewith, the first electromagnetic beam being directed into a first direction, the second electromagnetic beam being directed into a second direction.

18. The beam steerer of claim 17 wherein the first frequency band is in the RF range of the electromagnetic spectrum, and the second frequency band is in the optical range of the electromagnetic spectrum.

19. A method of steering a first electromagnetic beam and a second electromagnetic beam, the first electromagnetic beam having a frequency within a first region of the electromagnetic spectrum, the second electromagnetic beam having a frequency within a second region of the electromagnetic spectrum, the method comprising the steps of:
  (a) receiving the first electromagnetic beam and the second electromagnetic beam;
  (b) steering the first electromagnetic beam into a first direction; and
  (c) steering the second electromagnetic beam into a second direction.

20. The method of claim 19, wherein the first electromagnetic beam is a RF beam and thus has frequencies within the RF region of the electromagnetic spectrum, and wherein the second electromagnetic beam is an optical beam and thus has frequencies within the optical region of the electromagnetic spectrum.

21. The method of claim 20, wherein the step of steering the RF beam into a first direction comprises applying different phase shifts to different parts of the RF beam, and wherein the step of steering the optical beam into a second direction comprises applying different phase shifts to different parts of the optical beam.

22. The method of claim 21, wherein the step of steering the RF beam is realized with an RF beam steerer and the step of steering the optical beam is realized with an optical beam steerer.

23. The method of claim 22, wherein the RF beam steerer and the optical beam steerer are combined into a combined beam steerer, the combined beam steerer comprising:
  a first major surface having disposed thereon an array of conductive elements associated with the RF beam steerer;
  a second major surface having an array of optical elements disposed thereon associated with the optical beam steerer;
  a substrate disposed between the first major surface and the second major surface, the substrate having a thickness;
wherein a spacing of the conductive elements in the RF beam steerer is at least 10 times a wavelength associated with the optical beam to be steered, so that the RF beam steerer appears to be essentially optically transparent to the optical beam, and wherein the spacing of the optical elements in the optical beam steerer is sufficiently small so that the optical beam steerer functions as a ground plane for the RF beam steerer.

24. The method of claim 23, wherein the step of applying phase shifts to the RF beam is realized by electrically connecting or disconnecting the conductive elements by respectively closing or opening MEM switches disposed therebetween.

25. The method of claim 23, wherein the spacing between the optical elements disposed on the second surface is at least 1000 times less than the wavelength associated with the RF beam, the second surface thereby being seen as a ground plane by the RF beam.

26. The method of claim 25, wherein the spacing between the optical elements is about 0.5 to about 1 times the wavelength of the optical beam, and the spacing of the conductive elements in the RF beam steerer is about 0.5 to about 1 times the wavelength of the RF beam.

27. The method of claim 23, wherein the step of applying phase shifts to the RF beam is realized by reconfiguring the conductive elements using RF MEM switch arrays.

28. The method of claim 23, wherein the step of applying phase shifts to the RF beam is realized by reconfiguring the conductive elements using PIN diode arrays.

29. The method of claim 23, wherein the step of applying phase shifts to tile optical beam is realized with MEM steerable grating elements.

30. The method of claim 23, wherein the step of applying phase shifts to the optical beam is realized with phase shifting elements which are adjustable in height relatively to the second major surface.

31. The method of claim 23, wherein the substrate is substantially transparent to the optical beam, and wherein the thickness of the substrate is about one fourth of a wavelength associated with the RF beam.

32. The method of claim 23, further comprising the steps of:
  (a) detecting with a RF detector the RF beam steered by the combined beam steerer; and
  (b) detecting with an optical detector the optical beam steered by the combined beam steerer.

33. A combination RF and optical beam steerer for steering RF energy and optical energy, the combination RF and optical beam steerer comprising an optically transparent substrate having first and second major surfaces, the first surface having disposed thereon an array of conductive elements associated with a radio frequency beam steerer and the second surface thereof having an array of elements disposed thereon associated with an optical beam steerer, a spacing of the elements in the RF beam steerer being at least 10 times the wavelength of the optical energy to be steered so that the RF beam steerer appears to be essentially optically transparent to the optical energy whereas the array associated with the optical beam steerer is sufficiently closely spaced so as to function as a ground plane for the RF beam steerer.

34. The combination beam steerer of claim 33 wherein the RF energy is steered into a first direction by the RF beam steerer, and the optical energy is steered into a second direction by the optical beam steerer.

35. The combination beam steerer of claim 34 wherein the RF energy and the optical energy are simultaneously received by the combination beam steerer.

36. The combination beam steerer of claim 35, wherein the array of elements disposed on the second surface comprises optical phase steering elements.

37. The combination beam steerer of claim 36, wherein a spacing between the optical phase steering elements disposed on the second surface is at least 1000 times less than the wavelength of the RF energy, the second surface thereby being seen as a ground plane by the RF energy.

38. The combination beam steerer of claim 37, wherein the distance between the first and second surfaces is about one fourth of the wavelength of the RF energy.

39. The beam steerer of claim 38, wherein the optical phase steering elements comprise MEM steerable grating elements.

40. The combination beam steerer of claim 38, wherein the optical phase steering elements comprise phase shifting elements.

41. The combination beam steerer of claim 40, wherein the phase shifting elements are adjustable in height relatively to the second surface.

42. The combination beam steerer of claim 38, wherein the conductive elements comprise a linear array of conductors, the conductors being electrically connected or disconnected by respectively closing or opening RF MEM switches disposed therebetween.

43. The combination beam steerer of claim 38, wherein the array of conductive elements comprises conductors arranged in a grid, the grid having grid points formed at junctions of the conductors, and wherein RF MEM switches are disposed at the grid points, the RF MEM switches electrically connecting or disconnecting portions of the array of conductive elements.

44. The combination beam steerer of claim 38, wherein the array of conductive elements is reconfigured by using RF MBM switch arrays.

45. The combination beam steerer of claim 38, wherein the the array of conductive elements is reconfigured by using PIN diode arrays.

46. The combination beam steerer of claim 38 further comprising an RF detector for detecting the RF energy directed to the RF detector by the RF beam steerer, and an optical detector for detecting the optical energy directed to the optical detector by the optical beam steerer.

47. The beam steerer of claim 38, wherein the spacing between the optical phase steering elements is within a range of about 0.5 to about 1.0 times the wavelength of the optical energy, and the spacing between the RF beam steering elements is within a range of about 0.5 to about 1.0 times the wavelength of the RF energy.

* * * * *